United States Patent
Takemoto et al.

(10) Patent No.: US 10,344,173 B2
(45) Date of Patent: Jul. 9, 2019

(54) INKJET INK

(71) Applicant: General Co., Ltd., Osaka (JP)

(72) Inventors: Hidehiro Takemoto, Osaka (JP); Kozo Isobe, Osaka (JP)

(73) Assignee: GENERAL CO., LTD, Osaka (JP)

( * ) Notice: Subject to any disclaimer, the term of this patent is extended or adjusted under 35 U.S.C. 154(b) by 0 days.

(21) Appl. No.: 15/553,167

(22) PCT Filed: Feb. 22, 2016

(86) PCT No.: PCT/JP2016/055086
§ 371 (c)(1),
(2) Date: Aug. 23, 2017

(87) PCT Pub. No.: WO2016/136675
PCT Pub. Date: Sep. 1, 2016

(65) Prior Publication Data
US 2018/0072902 A1     Mar. 15, 2018

(30) Foreign Application Priority Data
Feb. 24, 2015     (JP) .................................. 2015-034432

(51) Int. Cl.
    *C09D 11/102*     (2014.01)
    *C09D 11/103*     (2014.01)
    *C09D 11/36*     (2014.01)
    *B41J 2/01*     (2006.01)
    *B41M 5/00*     (2006.01)
    *C09D 11/328*     (2014.01)

(52) U.S. Cl.
    CPC ............... *C09D 11/103* (2013.01); *B41J 2/01* (2013.01); *B41M 5/00* (2013.01); *C09D 11/328* (2013.01); *C09D 11/36* (2013.01)

(58) Field of Classification Search
CPC ...... C09D 11/102; C09D 11/103; C09D 11/36
See application file for complete search history.

(56) References Cited

U.S. PATENT DOCUMENTS

| | | | |
|---|---|---|---|
| 4,248,636 A | | 2/1981 | Sasaki et al. |
| 5,279,653 A | * | 1/1994 | Kobayashi ............. C09D 11/16 106/31.05 |
| 2007/0070158 A1 | * | 3/2007 | Sakasai ................... C09D 11/30 347/100 |
| 2017/0037269 A1 | * | 2/2017 | Isobe ......................... B41J 2/01 |

FOREIGN PATENT DOCUMENTS

| | | |
|---|---|---|
| JP | S53-021604 A | 2/1978 |
| JP | H05-017717 A | 1/1993 |
| JP | H09-111176 A | 4/1997 |
| JP | H09-176531 A | 7/1997 |
| JP | H10-140060 A | 5/1998 |
| JP | H10-204345 A | 8/1998 |
| JP | H10-245513 A | 9/1998 |
| JP | 2000-038530 A | 2/2000 |
| JP | 2000-178487 A | 6/2000 |
| JP | 2001-040255 A | 2/2001 |
| JP | 2008-285522 A | 11/2008 |
| JP | 2009-249578 A | 10/2009 |
| JP | 2010-503741 A | 2/2010 |
| JP | 2011-105818 A | 6/2011 |
| JP | 2012-040742 A | 3/2012 |
| JP | 2015-221887 A | 12/2015 |
| WO | WO 2014-068280 A1 | 5/2014 |
| WO | WO 2014-200567 A1 | 12/2014 |

* cited by examiner

*Primary Examiner* — Vu A Nguyen

(74) *Attorney, Agent, or Firm* — Rabin & Berdo, P.C.

(57) ABSTRACT

An inkjet ink includes a binder resin, a tackifier, a colorant, and an organic solvent. The binder resin is a phenol resin having a softening point in a range from 70 degrees Celsius or more to 125 degrees Celsius or less. The colorant is a dye. The tackifier is a terpene phenol resin whose hydroxyl value is 10 to 45 mgKOH/g.

6 Claims, No Drawings

INKJET INK

TECHNICAL FIELD

The present invention relates to a non-aqueous inkjet ink.

BACKGROUND ART

When letters, patterns, images, or the like (which are hereinafter referred to generically as "printings" if necessary) are printed, for example, on a non-absorptive surface of a piece of metal such as aluminum foil or the bottom lid or top lid of a can; a plastic film; a sheet of coated paper; or a sheet of laminated paper according to an inkjet printing method, it has heretofore been a common practice to heat and dry the printings that have been printed thereon.

However, recently, an inkjet ink, such as HEATLESS INK (registered trademark), has been developed and been put to practical use in which a heating/drying step can be excluded by providing quick-drying properties resulting from the fact that only an organic solvent is used as a solvent or that, even when water is used together as a solvent, a so-called organic-solvent-rich state is created by using an organic solvent more abundantly than water.

Additionally, recently, various examinations have been made to develop a quick-drying inkjet ink that is capable of improving the fixability of printings with respect to a surface of a metallic object such as aluminum foil or the bottom lid or top lid of a can (hereinafter, which is referred to briefly as a "metal surface" if necessary), or a surface made of material having low polarity, such as a surface of a polyolefin-based object of which a polypropylene film or a polypropylene laminated paper (hereinafter, which is referred to briefly as a "low-polarity surface" if necessary), which has difficulty particularly in improving the fixability of printings among the non-absorptive surfaces.

Although the use of the inkjet printing method has been examined, for example, in order to print a drug name or the like on a surface of aluminum foil that forms the PTP (Press Through Package) of medicines or in order to print a mark of, for example, a production factory, a best-before date, or the like on the bottom lid or top lid of a can, however the metal surface such as the surface of the aluminum foil or the bottom lid or top lid of the can is non-absorptive so that the inkjet ink does not infiltrate into its inside, and therefore it is difficult to firmly fix printings, such as the drug name.

Therefore, for example, PTL 1 proposes to improve the adhesiveness of printings with respect to a metal surface by additionally combining a carboxylic acid that has a benzothiazole ring with a non-aqueous, quick-drying inkjet ink including a colorant, a binder resin, and an organic solvent.

PTL 2 proposes to improve the adhesiveness of printings with respect to a metal surface by selectively using a styrene-maleic acid resin as a binder resin.

However, disadvantageously, in the inkjet inks of PTL 1 and PTL 2, the effect of improving the fixability of printings with respect to the metal surface or the low-polarity surface or the like based on the improvement of adhesiveness has not yet been sufficient, and the printings are easily blurred or easily come off, for example, when the printings are repeatedly rubbed with a fingertip or the like.

Additionally, disadvantageously, in the inkjet inks of PTL 1 and PTL 2, if a decapping time becomes long, a printer nozzle will be clogged and, when printing is restarted, blurring is liable to occur in a case in which the inkjet ink is used in, for example, an on-demand type inkjet printer.

The term "decapping time" denotes a period of time during which an inkjet ink in a nozzle among nozzles provided in an on-demand type inkjet printer is continuously being exposed to the open air in a standby state in which ink droplets are not discharged in accordance with a printing pattern in intermittent printing.

Inmost cases, an on-demand type inkjet printer is normally provided with a function designed to close a nozzle (to cap a nozzle) so that clogging does not occur resulting from the fact that an inkjet ink in the nozzle is exposed to the open air and is dried while the operation of the printer is being stopped.

However, such capping is released when printing is performed, and therefore a nozzle, which is in a standby state particularly when intermittent printing is performed, remains in a state (decapped state) in which the nozzle is not closed until ink droplets are discharged next time, and the inkjet ink in the nozzle is continuously exposed to the open air during that time.

Therefore, there is a tendency for the nozzle to be clogged more easily in proportion to an increase in this period of time, i.e., in proportion to an increase in the duration of the decapping time.

Particularly in a thermal type inkjet printer in which bubbles are generated by momentarily heating an inkjet ink and in which an ink equivalent to an increase in its volume is discharged as ink droplets through a nozzle, a solvent is repeatedly volatilized because of the generation of the bubbles when printing is performed, and, in response thereto, its local concentration is repeatedly changed, and therefore there is a tendency for solids, such as a binder resin, to be easily precipitated and for a nozzle to be easily clogged therewith during the decapping time.

Hereinafter, a feature characterized in that the nozzle is not easily clogged during the decapping time is evaluated in terms of whether "intermittent printability" is excellent or not. An inkjet ink that causes clogging during a very short decapping time can be evaluated as being not excellent in intermittent printability, whereas an inkjet ink can be evaluated as becoming more excellent in intermittent printability in proportion to an increase in the duration of a decapping time during which clogging is not caused.

In the case of a medicine, its kind etc., must be reliably discriminated from another. Therefore, printings that have been printed in PTP or the like are required not only to be not easily blurred in printing because of clogging that results from the defect in intermittent printability but also to be not easily blurred or not easily come off when the printings are repeatedly rubbed with a fingertip or the like as described above.

In order to improve the fixability of printings with respect to a low-polarity surface, such as a polyolefin-based surface, for example, PTL 4 proposes to combine at least one kind that is selected from the group consisting of a terpene phenol resin, a dicyclopentadiene resin, and a rosin ester resin and that is used as a tackifier functioning to give tackiness to a polyamide resin with a non-aqueous, quick-drying inkjet ink including the polyamide resin as a binder resin.

PTL 5 proposes to concurrently use two kinds of polyamide resins that are mutually different in acid number and each of which is used as a binder resin, and proposes to combine a rosin-modified maleic acid resin and/or a terpene phenol resin that are/is used as a tackifier therewith.

Additionally, PTL 6 proposes to combine a polyamide resin that is used as a binder resin, a rosin-modified maleic acid resin that is used as a tackifier, and a titanium chelate together.

However, disadvantageously, in any of the inkjet inks of PTL 4 to PTL 6, precipitation is liable to occur because stability is insufficient during ink storage, and blurring is liable to occur when printing is performed because of clogging resulting from the aforementioned defect of intermittent printability in addition to the fact that the effect of improving the fixability of printings with respect to the aforementioned low-polarity surface or the metal surface is still unsatisfactory.

PTL 7 proposes to concurrently use a polyamide resin that is used as a binder resin and a terpene phenol resin and/or a rosin ester resin that has a specific hydroxyl value.

According to an inkjet ink in which a dye is additionally joined as a colorant in the arrangement of PTL 7 mentioned above, it is possible to more greatly improve the fixability of printings with respect specifically to a low-polarity surface, such as a polyolefin-based surface, than conventional inkjet inks, such as those of PTL 4 to PTL 6.

However, the aforementioned inkjet ink is yet insufficient in the fixability of printings with respect specifically to a metal surface, and still has a problem in the fact that the printings are easily blurred or easily come off when the printings are repeatedly rubbed with a fingertip or the like.

There is a case in which a pigment is required to be used as a colorant in an inkjet ink, i.e., for example, a white pigment, such as titanium oxide, is required to be used as a colorant in order to express white.

However, disadvantageously, in an inkjet ink in which a pigment is additionally joined as a colorant in the arrangement of PTL 7, the low-polarity surface, without being limited to the metal surface, becomes insufficient in the fixability of printings, and the printings are easily blurred or easily come off when the printings are repeatedly rubbed with a fingertip or the like.

CITATION LIST

Patent Literature

PTL 1: Japanese Published Unexamined Patent Application No. 9-176531
PTL 2: Japanese Published Unexamined Patent Application No. 10-245513
PTL 3: Japanese translation of PCT international application No. 2010-503741
PTL 4: Japanese Published Unexamined Patent Application No. 10-140060
PTL 5: Japanese Published Unexamined Patent Application No. 2000-038530
PTL 6: Japanese Published Unexamined Patent Application No. 2000-178487
PTL 7: Japanese Published Unexamined Patent Application No. 2015-221887

SUMMARY OF INVENTION

Technical Problem

An object of the present invention is to provide an inkjet ink that is characterized by being excellent in intermittent printability particularly in being used in an on-demand type inkjet printer, that is characterized in that printings are not easily blurred when printing is restarted, and that is characterized in that printings that have been printed on a metal surface or a low-polarity surface or the like are not easily blurred or do not easily come off even if the printings are repeatedly rubbed with a fingertip or the like.

Solution to Problem

The present invention is an inkjet ink comprising a phenol resin whose softening point is 70° C. or more and is 125° C. or less, a tackifier, a colorant, and an organic solvent.

Advantageous Effects of Invention

According to the present invention, it is possible to provide an inkjet ink that is characterized by being excellent in intermittent printability particularly in being used in an on-demand type inkjet printer, that is characterized in that printings are not easily blurred when printing is restarted, and that is characterized in that printings that have been printed on a metal surface or a low-polarity surface or the like are not easily blurred or do not easily come off even if the printings are repeatedly rubbed with a fingertip or the like.

DESCRIPTION OF EMBODIMENTS

As mentioned above, the present invention is an inkjet ink that includes a phenol resin having a softening point ranging from 70° C. to 125° C., a tackifier, a colorant, and an organic solvent.

In the present invention, the softening point VT (° C.) of a phenol resin is represented by a value calculated according to Formula (1):

[Mathematical Formula 1]

$$VT(° C.) = \frac{VT_{max} + VT_{min}}{2} \tag{1}$$

from the upper limit $VT_{max}$ (° C.) and the lower limit $VT_{min}$ (° C.) of measurement values measured in accordance with a test method mentioned in Japanese Industrial Standards JIS K 7206: 1997 "Plastics-Thermoplastic materials-Determination of Vicat softening temperature (VST)" (ISO306: 1994).

A phenol resin is originally excellent in adhesiveness to a metal surface, a low-polarity surface, or the like.

However, printings which consist of an inkjet ink including a phenol resin whose softening point VT (° C.) calculated according to Formula (1) is less than 70° C. are weak against heat, and are softened by frictional heat caused when those are repeatedly rubbed with a fingertip or the like after printing, and reach a state of being easily blurred or a state of easily coming off.

Additionally, there is a substantially proportional relationship between the softening point VT (° C.) and the molecular weight of a phenol resin, and a phenol resin whose softening point VT (° C.) is less than 70° C. is small in molecular weight, and is easily dissolved by a fatty ingredient that is low in molecular weight, such as sebum, and therefore this also causes a state in which the printings are easily blurred or a state in which the printings easily come off when those are repeatedly rubbed with a fingertip or the like after printing.

On the other hand, printings printed with an inkjet ink including a phenol resin whose softening point VT (° C.) calculated according to Formula (1) is more than 125° C. are hard and brittle, and likewise reach a state of being easily blurred or a state of easily coming off when the printings are repeatedly rubbed with a fingertip or the like after printing.

Additionally, when printings are printed on a plastically deformable surface made of, for example, aluminum foil that particularly forms PTP, the printings cannot satisfactorily follow the plastic deformation of the surface, so that those are easily blurred or easily come off.

There is a substantially inversely-proportional relationship between the molecular weight of a phenol resin and dissolubility with respect to an organic solvent, and a phenol resin that is great in molecular weight and whose softening point VT (° C.) exceeds 125° C. is low in dissolubility with respect to an organic solvent, and is easily precipitated into an inkjet ink during a decapping time, and therefore intermittent printability deteriorates, and printings are easily blurred.

Additionally, blurring makes film formation imperfect, and printings will be more easily blurred or will more easily come off if the printings are repeatedly rubbed with a fingertip or the like after printing.

On the other hand, the selective use of a phenol resin whose softening point VT (° C.) falls within the aforementioned range makes it possible to solve any of the aforementioned various problems.

The tackifier functions to further improve the adhesiveness of printings with respect to a metal surface, a low-polarity surface, or the like, and, in addition, functions to raise the film strength or functions to heighten flexibility of printings while being interposed between phenol resins. Therefore, it is possible to even more excellently restrain printings from being blurred or from coming off when the printings are repeatedly rubbed with a fingertip or the like after printing. Additionally, it is possible to improve the following capability of printings with respect to, for example, a plastically deformable surface made of, for example, aluminum foil that particularly forms PTP.

Therefore, the concurrent use of the tackifier with the aforementioned specific phenol resin makes it possible to provide an inkjet ink that is characterized by being excellent in intermittent printability particularly in being used in an on-demand type inkjet printer, that is characterized in that printings are not easily blurred when printing is restarted, and that is characterized in that printings that have been printed on a metal surface or a low-polarity surface or the like are not easily blurred or do not easily come off even if the printings are repeatedly rubbed with a fingertip or the like.

By the way, in PTL 1 and PTL 3, a phenol resin and a tackifier such as a terpene phenol resin, a rosin resin, or the like are exemplified as a binder resin.

However, neither of the Patent Literatures describes an embodiment in which an effect that is actually obtained by using a phenol resin as a binder resin is verified, and neither of the Patent Literatures entirely describes the fact that the range of the softening point of the phenol resin is greatly concerned in characteristics of an inkjet ink or characteristics of printings that have been printed, and neither of the Patent Literatures entirely describes arrangements, such as a concrete range of the softening point, that are defined in each claim of the present application.

Likewise, neither of the Patent Literatures entirely describes the fact that the addition of a terpene phenol resin and a rosin resin, each of which is used as a tackifier, to a phenol resin is effective in improving the aforementioned characteristics, the fact that the range of its hydroxyl value and the range of its acid value are concerned in characteristics of an inkjet ink or characteristics of printings that have been printed, and arrangements, such as a preferred range of the hydroxyl value or the acid value, that are defined in each claim of the present application.

<<Phenol Resin>>

Various phenol resins each of which has adhesiveness with respect to a metal surface, a low-polarity surface, or the like as mentioned above and each of which has a softening point VT (° C.) falling within a range from 70° C. to 125° C. calculated according to Formula (1) can be mentioned as the phenol resin. This reason is as mentioned above.

In consideration of even further improving the aforementioned effects, the softening point VT (° C.) of the phenol resin is preferably 80° C. or more, particularly 90° C. or more, and is preferably 120° C. or less, particularly, 110° C. or less in the aforementioned range.

It is preferable to use particularly a novolak resin, which is a thermoplastic resin, as the phenol resin.

Additionally, it is preferable to concurrently use two kinds of phenol resins having mutually different softening points VT (° C.) that fall within the aforementioned range as the phenol resin.

If such two kinds of phenol resins having mutually different softening points VT (° C.) are concurrently used, it is possible to excellently fulfill both the effect of improving the film strength or flexibility of printings printed on a metal surface, a low-polarity surface, or the like while maintaining excellent intermittent printability by means of one phenol resin whose softening point VT (° C.) is lower than the other phenol resin and the effect of becoming difficult for the printings printed thereon to be easily softened by frictional heat and to be easily dissolved by a fatty ingredient, such as sebum, by means of one phenol resin whose softening point VT (° C.) is higher than the other phenol resin, and therefore it is possible to produce an inkjet ink excellent in the respective characteristics.

In consideration of even further improving these effects, it is preferable to concurrently use two kinds of phenol resins, i.e., a phenol resin whose softening point VT (° C.) is less than 100° C. and a phenol resin whose softening point VT (° C.) is 100° C. or more as the two kinds of phenol resins mentioned above.

Additionally, in consideration of the fact that the mass ratio between the two kinds of phenol resins even further improves the effects obtained by the concurrent use, it is preferable to have the equation (phenol resin whose softening point is higher)/(phenol resin whose softening point is lower)=1/2 to 2/1, particularly 1/1 to 2/1.

However, in some cases, it is preferable to use only one kind of phenol resin having a specific softening point VT (° C.) as the phenol resin in consideration of the general-purpose properties and the like of an inkjet ink.

In other words, there is a case in which a client of an inkjet printer uses the inkjet printer after customizing its printing conditions into values regarded as being optimal by client's company without employing initial values set by the manufacturer of the printer.

For example, in a thermal type inkjet printer, there is a case in which the heat temperature, the printing speed, etc., of an inkjet ink are changed from initial values.

However, when an inkjet ink in which two kinds of phenol resins having mutually different softening points VT (° C.) are concurrently used is used in, for example, an inkjet printer having a long decapping time resulting from setting the heat temperature higher than initial values or resulting from setting the printing speed lower therethan, particularly phenol resin whose softening point is higher is liable to be easily precipitated.

Additionally, disadvantageously, there is a fear that a nozzle will be easily clogged because of precipitation, and therefore printings will be blurred or a continuous discharge capability will deteriorate.

Therefore, there is a case in which, when two kinds of phenol resins are concurrently used, a countermeasure, such as a change in combination of phenol resins, is required to be taken depending on a difference in the setting of printing conditions even if the same inkjet printer is used.

On the other hand, particularly if only one kind of phenol resin having a moderate softening point VT (° C.) falling within the preferred range mentioned above is selected and used, it is possible to, for example, restrain a nozzle from being clogged because of the precipitation of the aforementioned phenol resin whose softening point is higher.

Therefore, it becomes possible to perform moderately-excellent printing that approximates a case in which two kinds of phenol resins are concurrently used regardless of a difference in the setting of printing conditions, and it is possible to obtain an inkjet ink having high general-purpose properties that can cope with inkjet printers that are variously different from each other in the setting of printing conditions while having a single composition using only one kind of phenol resin.

The compounding ratio of a phenol resin is preferably 2 mass % or more of the total amount of an inkjet ink, and is preferably 20 mass % or less thereof.

Additionally, the compounding ratio of a phenol resin in an inkjet ink, which is used in a continuous type inkjet printer in which printing is performed by forming ink droplets particularly while circulating an ink or a piezo-type inkjet printer in which ink droplets are discharged from a nozzle by means of vibrations of a piezoelectric element among on-demand type printers, is preferably 3 mass % or more in the aforementioned range, and is preferably 15 mass % or less therein.

On the other hand, the compounding ratio of a phenol resin in an inkjet ink that is used in a thermal type inkjet printer among on-demand type printers is preferably 3 mass % or more in the aforementioned range, and is preferably 8 mass % or less therein.

If the compounding ratio of a phenol resin is less than the respective ranges in being used in any type of printer, there is a fear that the effect of improving the fixability of printings with respect to the metal surface, the low-polarity surface, or the like cannot be obtained.

On the other hand, if the compounding ratio of a phenol resin exceeds the aforementioned ranges, there is a fear that the viscosity of an inkjet ink will exceed a range suitable for each printer, and frequency responsibility will deteriorate particularly in a thermal type inkjet printer, so that the blurring of printings or the like is liable to occur because of a discharge defect.

With respect to the compounding ratio, when only one kind of phenol resin is compounded, the ratio is the compounding ratio of this phenol resin, and, when two kinds of phenol resins having mutually different softening points are concurrently used, the ratio is the compounding ratio of the total of the two kinds of phenol resins.

<<Organic Solvent>>

Various organic solvents that can produce a uniform inkjet ink by dissolving or dispersing components of a phenol resin, a tackifier described later, and the like are usable as an organic solvent.

Particularly in consideration of the fact that excellent volatility is given to an inkjet ink, the fact that an environmental load is reduced, etc., it is preferable to use an alcohol having one to three carbon atoms.

One or two or more kinds among methanol, ethanol, 1-propanol, and 2-propanol can be mentioned as the alcohol having one to three carbon atoms.

The point of alcohol selection is whether volatility and foamability are excellent or not when it is used and heated particularly in a thermal type inkjet printer and whether the dissolubility of a phenol resin or of a tackifier is excellent or not.

In other words, in volatility and foamability, the order of excellence is methanol>ethanol>2-propanol>1-propanol, and, in the dissolubility of a phenol resin and of a tackifier, the order of excellence is 1-propanol>2-propanol>ethanol>methanol, and it is preferable to use ethanol in consideration of both the coexistence of these characteristics and the reduction of an environmental load.

Additionally, in order to assist the dissolubility of a phenol resin or of a tackifier while using ethanol that is excellent in volatility and foamability as a principal component, 2-propanol and/or 1-propanol (which are/is hereinafter referred to generically as "propanol" if necessary) can also be concurrently used.

Various organic solvents to further assist the dissolution of a phenol resin or of a tackifier or to improve volatility and quick-drying properties may be slightly added to the alcohol having one to three carbon atoms as an organic solvent.

The compounding ratio of an organic solvent is set to correspond to the remaining amount of an inkjet ink, i.e., if only one kind among alcohols having one to three carbon atoms is singly used, the compounding ratio of this single alcohol is set to correspond to the remaining amount of an inkjet ink, and, if two or more kinds among the alcohols having one to three carbon atoms are concurrently used or if other organic solvents are additionally used together with the alcohols, the compounding ratio of the total of those components is set to correspond to the remaining amount of an inkjet ink.

In other words, it is recommended to compound other components that are constituent elements of an inkjet ink at a predetermined ratio and to prepare the inkjet ink by adding an organic solvent so that the total amount becomes 100 mass %.

<<Tackifier>>

Various tackifiers that function to improve the adhesiveness of printings with respect to a metal surface, a low-polarity surface, or the like and to improve the film strength or flexibility of printings while being interposed between phenol resins as described above can be used as a tackifier.

It is preferable to use at least one kind selected from the group consisting particularly of a terpene phenol resin and a rosin ester resin.

<<Colorant>>

Various dyes, pigments, etc., can be mentioned as a colorant.

<Dye>

It is preferable to use particularly an oil-soluble dye as a dye.

An oil-soluble dye is dissolved in an alcohol having one to three carbon atoms at a molecular level, and is not easily precipitated, and therefore it is possible to more excellently improve the intermittent printability of an inkjet ink.

Additionally, an oil-soluble dye is compatibilized in a phenol resin at a molecular level, and therefore it is possible to improve the continuity, integrity, and cohesiveness of printings, and it is possible to more excellently restrain printings from being blurred or from coming off when the printings that have been printed on a metal surface, a low-polarity surface, or the like are repeatedly rubbed with a fingertip or the like.

With respect to the oil-soluble dye, it is possible to use one kind or two or more kinds of oil-soluble dyes at an appropriate ratio in accordance with the color tone and color density of an inkjet ink.

For example, various dyes and the like listed below can be mentioned as concrete examples of the oil-soluble dye.

(Yellow)

C.I. Solvent yellow 2, 14, 15, 16, 19, 21, 32, 56, 61, 65, 76, 79, 80, 81, 82, 83, 88, 89, 90, 91, 151; AIZEN (registered trademark) S. B. N. Yellow 543, SPILON (registered trademark) Yellow C-GNH, C-2GH made by Hodogaya Chemical Co., Ltd.; Oplas (registered trademark) Yellow 140, VALIFAST (registered trademark) YELLOW 1101, 1109, 1151, 1171, 3108, 3120, 3150, 3170, 3180, 4120, 4121 made by ORIENT CHEMICAL INDUSTRIES Co., Ltd.; Alcohol Yellow Y-10, Oil Yellow CH made by CHUO GOUSEI KAGAKU CO., LTD.; DIARESIN (registered trademark) Yellow L3G made by Mitsubishi Chemical Corporation.

(Orange)

C.I. Solvent orange 1, 2, 5, 6, 11, 14, 20, 36, 41, 44, 45, 54, 56, 57, 58, 59, 62; VALIFAST ORANGE 1201, 2210, 3208, 3209, 3210 made by ORIENT CHEMICAL INDUSTRIES Co., Ltd.

(Red)

C.I. Solvent red 1, 3, 8, 23, 24, 25, 27, 35, 49, 78, 81, 82, 83, 84, 91, 96, 99, 100, 102, 109, 118, 119, 121, 122, 123, 124, 127, 128, 129, 130, 131, 132, 133, 134, 142, 160, 218, C.I. Disperse red 9; Orient Oil Pink OP, SPIRIT Red 102, VALIFAST Red 1308, 1320, 1355, 1364, 1388, 2303, 2320, 3304, 3306, 3311, 3312, 3320, PINK 2310N made by ORIENT CHEMICAL INDUSTRIES Co., Ltd.; AIZEN SPILON Fiery Red BH, Red C-GH, C-BH, Pink BH made by Hodogaya Chemical Co., Ltd.; AL Red 2308, Alcohol Pink P-30 made by CHUO GOUSEI KAGAKU CO., LTD.

(Brown)

C.I. Solvent brown 3, 23, 24, 25, 37, 42, 43, 44, 58.

(Green)

C.I. Solvent green 3, 16, 21, 22; VALIFAST GREEN 1501 made by ORIENT CHEMICAL INDUSTRIES Co., Ltd.

(Blue)

C.I. Solvent blue 5, 11, 12, 24, 25, 38, 44, 46, 55, 64, 67, 70, 73, 75; Orient Oil Blue 603, VALIFAST Blue 1621, 1631, 2604, 2606, 2620, 2670 made by ORIENT CHEMICAL INDUSTRIES Co., Ltd.; AIZEN SPILON Blue C-RH, GNH, S.P.T. Blue 121 made by Hodogaya Chemical Co., Ltd.; Alcohol Blue B-10 made by CHUO GOUSEI KAGAKU CO., LTD.

(Violet)

C.I. Solvent violet 1, 2, 19, 21; VALIFAST VIOLET 1701, 1704 made by ORIENT CHEMICAL INDUSTRIES Co., Ltd.; AIZEN SPILON Violet C-RH, ECH made by Hodogaya Chemical Co., Ltd.

(Black)

C.I. Solvent Black 3, 5, 7, 22, 23, 25, 27, 28, 29, 30, 34, 35, 43, 47, 123; VALIFAST BLACK 1807, 1815, 3804, 3807, 3808, 3820, 3830, 3840, 3866, 3870 made by ORIENT CHEMICAL INDUSTRIES Co., Ltd.; Orasol (registered trademark) Black X55, X45, X51 made by BASF SE; RLS (Solvent Black 29), CN (Solvent Black 28) made by Intraplast Co., Ltd.

Particularly in consideration of improvements in light resistance of printing, it is preferable to use a metal complex dye among the oil-soluble dyes.

<Pigment>

Various inorganic pigments and/or organic pigments that are capable of improving the light resistance, the weather resistance, etc., of printings can be used as the pigment.

A metallic compound, such as titanium oxide or iron oxide, or one kind or two or more kinds of various carbon blacks, such as a neutral type, an acid type, or a basic type, that is/are produced according to a publicly known method, such as a contact method, a furnace method, or a thermal method, can be mentioned as the inorganic pigment.

One kind or two or more kinds among, for example, an azo pigment (including azolake, insoluble azo pigment, condensed azo pigment, chelate azo pigment, etc.), a polycyclic pigment (e.g., phthalocyanine pigment, perylene pigment, perinone pigment, anthraquinone pigment, quinacridone pigment, dioxazine pigment, thioindigo pigment, isoindolinone pigment, or quinophthalone pigment), a dye chelate (e.g., basic dye type chelate or acid dye type chelate), a nitro pigment, a nitroso pigment, and an aniline black can be mentioned as the organic pigment.

With respect to the inorganic or organic pigment, one kind or two or more kinds can be used in accordance with the color tone of an inkjet ink. For example, if black is expressed with a carbon black, a cyan pigment may be added in order to make it seem to be more black-and-blue.

Additionally, the pigment may undergo processing onto its surface in order to improve dispersion stabilization in an inkjet ink.

Additionally, the pigment may be used to manufacture an inkjet ink, for example, in a state of a pigment dispersion liquid in which the pigment has been dispersed into an arbitrary solvent capable of excellently dispersing the pigment.

Various organic solvents capable of being excellently compatibilized with an alcohol having one to three carbon atoms can be used as the solvent. It is preferable to use an alcohol having one to three carbon atoms thereamong, particularly to use ethanol. Additionally, a dispersing agent or the like may be added to the pigment dispersion liquid in order to excellently disperse the pigment.

It is preferable to use a white pigment to express white, which cannot be expressed by a dye, as the pigment.

Additionally, it is preferable to use a titanium oxide, which is excellent particularly in concealability, as the white pigment, and any of various titanium oxides, such as a rutile-type or anatase-type titanium oxide, can be used as the titanium oxide.

In consideration of both the fact that dispersibility into an inkjet ink is improved and the fact that high concealability is given to printings, it is preferable to allow the titanium oxide to have a mean particle size of 0.15 μm or more, particularly 0.2 μm or more, and to have a mean particle size of 0.4 μm or less, particularly 0.3 μm or less.

For example, various pigments and the like listed below can be mentioned as concrete examples of pigments having a color other than white.

(Yellow Pigment)

C. I. Pigment Yellow 1, 2, 3, 12, 13, 14, 14C, 16, 17, 20, 24, 73, 74, 75, 83, 86, 93, 94, 95, 97, 98, 109, 110, 114, 117, 120, 125, 128, 129, 130, 137, 138, 139, 147, 148, 150, 151, 154, 155, 166, 168, 180, 185, 213, 214.

(Magenta Pigment)

C. I. Pigment Red 5, 7, 9, 12, 48 (Ca), 48 (Mn), 49, 52, 53, 57 (Ca), 57:1, 97, 112, 122, 123, 149, 168, 177, 178, 179, 184, 202, 206, 207, 209, 242, 254, 255.

(Cyan Pigment)
C. I. Pigment Blue 1, 2, 3, 15, 15:1, 15:3, 15:4, 15:6, 15:34, 16, 22, 60.
(Black Pigment)
C. I. Pigment Black 7.
(Orange Pigment)
C. I. Pigment Orange 36, 43, 51, 55, 59, 61, 71, 74.
(Green Pigment)
C. I. Pigment Green 7, 36.
(Violet Pigment)
C. I. Pigment Violet 19, 23, 29, 30, 37, 40, 50.
<<Dye-Based Compounding>>
<Tackifier>

In an inkjet ink in which a dye is used as a colorant, it is preferable to select and use at least one kind selected from the group consisting of a terpene phenol resin and a rosin ester resin whose hydroxyl value is 10 mgKOH/g or more and is 45 mgKOH/g or less as a tackifier.

A tackifier whose hydroxyl value is less than the aforementioned range is too low in polarity, and therefore dissolubility with respect specifically to the aforementioned alcohol having one to three carbon atoms is insufficient, and it is impossible to excellently dissolve it in an inkjet ink. Therefore, the storage stability of the inkjet ink is lowered, and precipitation is liable to occur, and intermittent printability is insufficient particularly when it is used in an on-demand type inkjet printer, so that the clogging of a nozzle is liable to occur during a decapping time.

In contrast, a tackifier whose hydroxyl value exceeds 45 mgKOH/g is high in polarity, and therefore it is possible to excellently dissolve it in the aforementioned alcohol, and it is possible to improve the storage stability of an inkjet ink. However, the tackifier having such a high hydroxyl value makes a great change in dissolubility in response to the volatilization of the alcohol, and therefore the viscosity of the inkjet ink is liable to greatly rise in response to the volatilization of the alcohol, for example, when it is continuously exposed to the open air in a nozzle of the on-demand type inkjet printer. Therefore, intermittent printability becomes defective, and the nozzle is easily clogged during the decapping time.

On the other hand, a tackifier whose hydroxyl value falls within the aforementioned range has moderate dissolubility that is neither too low nor too high with respect to an alcohol having one to three carbon atoms, and therefore it is possible to excellently dissolve it in an inkjet ink, and it is possible to improve the storage stability of the inkjet ink. Additionally, it is possible to improve intermittent printability so that the nozzle is not easily clogged during a decapping time.

Particularly in consideration of the fact that excellent intermittent printability is secured as much as possible particularly by improving the discharge capability from the nozzle of an inkjet ink, it is preferable to use a terpene phenol resin as the tackifier.

Various terpene phenol resins, each of which is, for example, a copolymer of a terpene and phenols having a basic skeleton $(C_5H_8)_p$ (where p is an integer) in which isoprenes are successively bound at the head-tail and each of which has a hydroxyl value falling within the aforementioned range, can be used as the terpene phenol resin.

One kind or two or more kinds among, for example, YS Polyster U130 (hydroxyl value: 25 mgKOH/g), YS Polyster U115 (hydroxyl value: 30 mgKOH/g) made by YASUHARA CHEMICAL CO., LTD. and SYLVARES (registered trademark) TP95 (hydroxyl value: 40 mgKOH/g) made by Arizona Chemical Co. can be mentioned as the terpene phenol resin.

Various rosin ester resins, for example, each of which is an ester of a rosin and alcohols composed mainly of an abietic type or pimaric type resin acid that is a monobasic carboxylic acid and that has an alkylated hydrophenanthrene nucleus and each of which has a hydroxyl value falling within the aforementioned range can be used as the rosin ester resin.

For example, a rosin composed of a resin acid including an unsaturated bond, such as an abietic acid or a dextropimaric acid, or a hydrogenated rosin composed mainly of a hydrogenated dihydroabietic or tetrahydroabietic acid can be mentioned as the rosin. For example, a glycerin, a pentaerythritol, a triethylene glycol, etc., can be mentioned as the alcohols.

One kind or two or more kinds among, for example, KSU005 (hydroxyl value: 11.5 mgKOH/g), KSU007 (hydroxyl value: 26.8 mgKOH/g), DS-822 (hydroxyl value: 29 mgKOH/g) made by Harima Chemicals, Inc., SUPER ESTER A-125 (hydroxyl value: 25 mgKOH/g), PENSEL (registered trademark) D-125 (hydroxyl value: 30 mgKOH/g), PINECRYSTAL (registered trademark) KE-359 (hydroxyl value: 43 mgKOH/g) made by ARAKAWA CHEMICAL INDUSTRIES, LTD., and Pentalyn (registered trademark) CJ (hydroxyl value: 40 mgKOH/g) made by Rika Fine-Tech Inc. can be mentioned as the rosin ester resin.

The compounding ratio of the tackifier is preferably 0.5 mass % or more of the total amount of the inkjet ink, particularly 1 mass % or more, and is preferably 5 mass % or less thereof, particularly 3 mass % or less.

If the compounding ratio of the tackifier is less than this range, tackiness will become insufficient, and there is a fear that printings cannot be excellently fixed on a metal surface, a low-polarity surface, or the like.

On the other hand, if the compounding ratio of the tackifier exceeds the aforementioned range, printings that have been printed will become viscous, and the printings will be easily blurred or will easily come off when the printings are repeatedly rubbed with a fingertip or the like, and, as a result, there is a fear that the printings cannot be excellently fixed on a metal surface, a low-polarity surface, or the like so as to cause the opposite effect of that intended. There is also a fear that the storage stability of the inkjet ink will deteriorate.

<Organic Solvent>

It is preferable to concurrently use propanol as the alcohol having one to three carbon atoms among organic solvents in order to assist the dissolubility of a phenol resin or of a tackifier while using ethanol that is excellent in volatility and foamability as a principal component as described above.

The compounding ratio between ethanol and propanol in these concurrently-used solvents is preferably 1.0 or more, particularly 2.0 or more, and is preferably 6.0 or less, particularly 4.0 or less in terms of the mass ratio E/P (where E designates the mass of ethanol, and P designates the mass of propanol).

If the mass ratio E/P is less than this range, the amount of propanol is excessive, and the dissolubility of a phenol resin or of a tackifier is too good, and therefore intermittent printability is lowered by the mechanism described above, and there is a fear that printings will be easily blurred.

On the other hand, if the mass ratio E/P exceeds the aforementioned range, the amount of ethanol is excessive, and the dissolubility of a phenol resin or of a tackifier becomes insufficient, and precipitation is easily caused during a decapping time, and therefore intermittent printability deteriorates so as to cause the opposite effect of that intended, and there is a fear that printings will be easily blurred.

The compounding ratio of an alcohol having one to three carbon atoms is preferably 70 mass % or more of the total amount of an inkjet ink, particularly 75 mass % or more, and is preferably 95 mass % or less thereof, particularly 90 mass % or less.

If the compounding ratio of the alcohol having one to three carbon atoms is less than this range, the viscosity of an inkjet ink exceeds a range suitable for each printer, and frequency responsibility deteriorates particularly in a thermal type inkjet printer, and there is a fear that blurring and the like will easily occur because of a discharge defect.

Although an alcohol having one to three carbon atoms functions as a bubble-generating component when the alcohol is heated in being used in a thermal type inkjet printer, if the compounding ratio thereof is less than the aforementioned range, the alcohol cannot excellently generate bubbles even if it is heated, and there is also a fear that proper ink droplets cannot be discharged through a nozzle.

On the other hand, if the compounding ratio of the alcohol having one to three carbon atoms exceeds the aforementioned range, discharge stability deteriorates, and therefore there is a fear that the productivity of a printing operation cannot be improved by increasing a printing speed.

A strong solvent to further assist the dissolution of a phenol resin or of a tackifier may be slightly add to the alcohol having one to three carbon atoms as an organic solvent.

One kind or two or more kinds among ketones, such as acetone, methyl ethyl ketone, methyl isobutyl ketone, and cyclohexanone; glycol ethers, such as diethylene glycol monomethyl ether, triethylene glycol monomethyl ether, propylene glycol monomethyl ether, and 3-methoxy-3-methyl-1-butanol; acetic esters, such as ethylene glycol monomethyl ether acetate, propylene glycol monomethyl ether acetate, diethylene glycol monobutyl ether acetate, and diethylene glycol monoethyl ether acetate, and the like can be mentioned as the strong solvent.

If an inkjet ink is dried too fast, film formation becomes insufficient, and printings will easily become brittle, and therefore a solvent that is low in volatile may be slightly added to the alcohol having one to three carbon atoms in order to delay the drying. The solvent that is low in volatile also functions to assist the dissolubility of a tackifier.

One kind or two or more kinds among alcohols having four to six carbon atoms, such as 1-butanol, 2-butanol, isobutyl alcohol, tert-butyl alcohol, and cyclohexanol; ethylene glycol, diethylene glycol, 1, 4-butanediol, methoxytriglycol, and polyethylene glycols can be mentioned as the solvent that is low in volatile and that functions to assist the dissolubility of a tackifier.

In consideration of the fact that the addition effect of each solvent is excellently expressed while excellently maintaining the aforementioned effects brought about by an alcohol having one to three carbon atoms, the compounding ratio of each of the various solvents mentioned above is preferably 0.5 mass % or more of the total amount of an inkjet ink, and is preferably 5 mass % or less thereof, particularly 3 mass % or less. These solvents are not necessarily required to be compounded.

Particularly, it is preferable to compound 1-butanol at 0.5 mass % or more of the total amount of an inkjet ink and at 2 mass % or less thereof.

If the compounding ratio of 1-butanol is less than this range, the effect of assisting dissolubility brought about particularly by 1-butanol becomes insufficient, or film formation becomes insufficient as mentioned above, and there is a fear that printings will become brittle. On the other hand, if the compounding ratio of 1-butanol exceeds the aforementioned range, there is a fear that the quick-drying properties of an inkjet ink will be impaired.

<<Pigment-Based Compounding>>
<Tackifier>

In an inkjet ink in which a pigment is used as a colorant, at least one kind selected from the group consisting of a terpene phenol resin and a rosin ester resin whose acid value is 2 mgKOH/g or more and is 10 mgKOH/g or less as a tackifier.

A tackifier whose acid value is less than the aforementioned range is too low in polarity, and therefore dissolubility with respect specifically to the aforementioned alcohol having one to three carbon atoms is insufficient, and it is impossible to excellently dissolve it in an inkjet ink. Therefore, the storage stability of the inkjet ink is lowered, and precipitation is liable to occur, and intermittent printability is insufficient particularly when it is used in an on-demand type inkjet printer, so that the clogging of a nozzle is liable to occur during a decapping time.

In contrast, a tackifier whose acid value exceeds the aforementioned range is high in polarity, and therefore it is possible to excellently dissolve it in the aforementioned alcohol, and it is possible to improve the storage stability of an inkjet ink. However, the tackifier having such a high acid value makes a great change in dissolubility in response to the volatilization of the alcohol, and therefore the viscosity of the inkjet ink is liable to greatly rise in response to the volatilization of the alcohol, for example, when it is continuously exposed to the open air in a nozzle of the on-demand type inkjet printer. Therefore, intermittent printability becomes defective, and the nozzle is easily clogged during the decapping time.

On the other hand, a tackifier whose acid value falls within the aforementioned range has moderate dissolubility that is neither too low nor too high with respect to an alcohol having one to three carbon atoms, and therefore it is possible to excellently dissolve it in an inkjet ink, and it is possible to improve the storage stability of the inkjet ink. Additionally, it is possible to improve intermittent printability so that the nozzle is not easily clogged during a decapping time.

In consideration of even further improving the aforementioned effects, it is preferable for the tackifier to have an acid value particularly of 3 mgKOH/g or more within the aforementioned range and an acid value particularly of 7 mgKOH/g or less therewithin.

Particularly in consideration of further improving the fixability of printings, it is preferable to use a rosin ester resin as the tackifier.

In other words, in the pigment-based compounding, it is possible to secure fixability in which printings are not blurred or do not come off when the printings are repeatedly rubbed with a fingertip or the like as mentioned above even if a terpene phenol resin is used as the tackifier.

However, it is preferable to select and use a rosin ester resin as the tackifier in order to secure fixability higher enough to be withstandable against a peel test in which a cellophane tape is attached onto printings and then is peeled off therefrom, which is required in printing with respect specifically to the low-polarity surface of a polyolefin-based material or the like.

As described above, various rosin ester resins each of which is an ester of a rosin and alcohols composed mainly of an abietic type or pimaric type resin acid that is a monobasic carboxylic acid and that has an alkylated hydrophenanthrene nucleus and each of which has an acid value falling within the aforementioned range can be used as the rosin ester resin.

One kind or two or more kinds among, for example, ESTER GUM AA-G (acid value: 7 mgKOH/g or less), AA-L (acid value: 7 mgKOH/g or less), A (acid value: 7 mgKOH/g or less), AAV (acid value: 7 mgKOH/g or less), AT (acid value: 10 mgKOH/g or less), and H (acid value: 10 mgKOH/g or less) made by ARAKAWA CHEMICAL INDUSTRIES, Ltd., HARIESTER TF (acid value: 8 mgKOH/g or less), HARITACK 8LJA (acid value: 3 to 10 mgKOH/g), and SE10 (acid value: 2 to 10 mgKOH/g) made by Harima Chemicals, Inc., can be mentioned as the rosin ester resin.

The compounding ratio of the tackifier is preferably 1 mass % or more of the total amount of the inkjet ink, particularly 3 mass % or more, and is preferably 8 mass % or less thereof, particularly 7 mass % or less.

If the compounding ratio of the tackifier is less than this range, tackiness will become insufficient, and there is a fear that printings cannot be excellently fixed on a metal surface, a low-polarity surface, or the like.

On the other hand, if the compounding ratio of the tackifier exceeds the aforementioned range, printings that have been printed will become viscous, and the printings will be easily blurred or will easily come off when the printings are repeatedly rubbed with a fingertip or the like, and, as a result, there is a fear that the printings cannot be excellently fixed on a metal surface, a low-polarity surface, or the like so as to cause the opposite effect of that intended. There is also a fear that the storage stability of an inkjet ink will deteriorate.

<Organic Solvent>

It is preferable to concurrently use propanol as the alcohol having one to three carbon atoms among organic solvents in order to assist the dissolubility of a phenol resin or of a rosin ester resin while using ethanol that is excellent in volatility and foamability as a principal component as described above.

The compounding ratio between ethanol and propanol in these concurrently-used solvents is preferably 1.0 or more, and is preferably 3.0 or less in terms of the mass ratio E/P mentioned above.

If the mass ratio E/P is less than this range, the amount of propanol is excessive, and the dissolubility of a phenol resin or of a rosin ester resin is too good, and therefore intermittent printability is lowered by the mechanism described above, and there is a fear that printings will be easily blurred.

On the other hand, if the mass ratio E/P exceeds the aforementioned range, the amount of ethanol is excessive, and the dissolubility of a phenol resin or of a rosin ester resin becomes insufficient, and precipitation is easily caused during a decapping time, and therefore intermittent printability deteriorates so as to cause the opposite effect of that intended, and there is a fear that printings will be easily blurred.

The compounding ratio of the alcohol having one to three carbon atoms is preferably 65 mass % or more of the total amount of an inkjet ink, particularly 70 mass % or more, and is preferably 95 mass % or less thereof, particularly 90 mass % or less.

If the compounding ratio of the alcohol having one to three carbon atoms is less than this range, the viscosity of an inkjet ink exceeds a range suitable for each printer, and frequency responsibility deteriorates particularly in a thermal type inkjet printer, and there is a fear that blurring and the like will easily occur because of a discharge defect.

Although an alcohol having one to three carbon atoms functions as a bubble-generating component when the alcohol is heated in being used in a thermal type inkjet printer as mentioned above, if the compounding ratio thereof is less than the aforementioned range, the alcohol cannot excellently generate bubbles even if it is heated, and there is also a fear that proper ink droplets cannot be discharged through a nozzle.

On the other hand, if the compounding ratio of the alcohol having one to three carbon atoms exceeds the aforementioned range, discharge stability deteriorates, and therefore there is a fear that the productivity of a printing operation cannot be improved by increasing a printing speed.

Various organic solvents described in the dye-based compounding may be slightly added to the alcohol having one to three carbon atoms as an organic solvent.

One kind or two or more kinds among ketones, such as acetone, methyl ethyl ketone, methyl isobutyl ketone, and cyclohexanone; glycol ethers, such as diethylene glycol monomethyl ether, triethylene glycol monomethyl ether, propylene glycol monomethyl ether, and 3-methoxy-3-methyl-1-butanol; acetic esters, such as ethylene glycol monomethyl ether acetate, propylene glycol monomethyl ether acetate, diethylene glycol monobutyl ether acetate, and diethylene glycol monoethyl ether acetate; alcohols having four to six carbon atoms, such as 1-butanol, 2-butanol, isobutyl alcohol, tert-butyl alcohol, and cyclohexanol; and ethylene glycol, diethylene glycol, 1, 4-butanediol, methoxytriglycol and polyethylene glycols can be mentioned as those various organic solvents.

In consideration of the fact that the addition effect of each solvent is excellently expressed while excellently maintaining the aforementioned effects brought about by an alcohol having one to three carbon atoms, the compounding ratio of each of the various solvents mentioned above is preferably 0.5 mass % or more of the total amount of an inkjet ink, and is preferably 5 mass % or less thereof, particularly 3 mass % or less. These solvents are not necessarily required to be compounded.

Particularly, it is preferable to compound 1-butanol at 0.5 mass % or more of the total amount of an inkjet ink and at 2 mass % or less thereof.

If the compounding ratio of 1-butanol is less than this range, the effect of assisting dissolubility brought about particularly by the 1-butanol becomes insufficient, or film formation becomes insufficient as mentioned above, and there is a fear that printings will become brittle. On the other hand, if the compounding ratio of 1-butanol exceeds the aforementioned range, there is a fear that the quick-drying properties of an inkjet ink will be impaired.

<<Other Components>>

Other binder resins, surfactants, lubricants, etc., may be additionally compounded with an inkjet ink of the present invention at an arbitrary ratio when needed.

<Other Binder Resins>

Comparatively hard resins, such as an epoxy resin and an acrylic resin, can be mentioned as other binder resins. It is possible to raise the hardness of printings by adding these resins, and it is possible to more excellently restrain printings from being blurred or from coming off when the printings that have been printed on a metal surface, a low-polarity surface, or the like are repeatedly rubbed with a fingertip or the like.

<Surfactant>

A surfactant functions to secure an excellent discharge characteristic while adjusting the wetting properties of an inkjet ink with respect to a nozzle, or functions to improve the image quality of printings while adjusting the wetting properties with respect to a metal surface, a low-polarity surface, or the like.

Various surfactants that can be dissolved in an alcohol having one to three carbon atoms among various surfactants, such as a silicone-based surfactant and a fluorine-based surfactant, are usable as surfactants, and it is preferable to use particularly a silicone-based surfactant.

For example, when printings are printed on a metal surface, the silicone-based surfactant is distributed in a state in which a polyether chain has been directed to the metal surface side in the printings that have been printed and in a state in which a siloxane chain has been directed to the surface of the printings, and therefore the silicone-based surfactant also functions to improve the slidability of the surface of the printings based on characteristics of the siloxane chain.

Therefore, it is also possible to even more excellently restrain printings that have been printed on a metal surface from being blurred or from coming off when the printings are repeatedly rubbed with a fingertip or the like.

Additionally, when printings are printed on a low-polarity surface, such as a polyolefin-based surface, the silicone-based surfactant also functions to restrain an alcohol having one to three carbon atoms from wetting and spreading in a surfacewise direction on the low-polarity surface.

Therefore, it is also possible to raise printing clarity and improve image quality.

The compounding ratio of the surfactant is preferably 0.1 mass % or more of the total amount of an inkjet ink, and is preferably 3 mass % or less thereof.

<Lubricant>

The compounding of a lubricant makes it possible to improve the resistance to scratch of printings, the resistance to wear thereof, and the resistance to transfer thereof.

Various fatty acid amides that can be dissolved in an alcohol having one to three carbon atoms among, for example, a saturated fatty acid amide, an unsaturated fatty acid amide, and a modified fatty acid amide can be mentioned as the lubricant, and it is preferable to use particularly an oleic amide.

The compounding ratio of the fatty acid amide is preferably 0.1 mass % or more of the total amount of an inkjet ink, and is preferably 1.0 mass % or less thereof.

The inkjet ink of the present invention including each component mentioned above is suitably usable in the aforementioned on-demand type inkjet printers according to a thermal method, a piezo method, or the like, and is also usable in a continuous type inkjet printer.

According to the inkjet ink of the present invention, unique effects are fulfilled by which it becomes possible to provide an inkjet ink that is characterized by being excellent in intermittent printability particularly in being used in an on-demand type inkjet printer, that is characterized in that printings are not easily blurred when printing is restarted, and that is characterized in that printings that have been printed on a metal surface or a low-polarity surface or the like are not easily blurred or do not easily come off even if the printings are repeatedly rubbed with a fingertip or the like.

EXAMPLES

Example 1-1

The following components were mixed together at the ratio shown in Table 1, and were then filtered by use of a membrane filter of 5 μm so as to prepare an inkjet ink.

(Phenol Resin)
(1) Novolak resin, PHENOLITE (registered trademark) TD-2131 made by DIC Corporation, softening point VT (° C.)=80° C.
(2) Novolak resin, PHENOLITE TD-2090 made by DIC Corporation, softening point VT (° C.)=120° C.

(Tackifier)
Terpene phenol resin, YS Polyster U115 made by YASUHARA CHEMICAL CO., LTD., Hydroxyl value: 30 mgKOH/g (Organic Solvent)
Ethanol
1-propanol
1-butanol (Dye)
C. I. Solvent black 29

(Surfactant)
Silicone-based surfactant

TABLE 1

| Component | | Parts by mass |
|---|---|---|
| Phenol Resin | VT(° C.) = 80° C. | 3.0 |
| | VT(° C.) = 120° C. | 3.0 |
| Tackifier (30 mgKOH/g) | | 1.5 |
| Ethanol | | 63.0 |
| 1-propanol | | 20.0 |
| 1-butanol | | 1.0 |
| Solvent Black 29 | | 7.0 |
| Silicone-based Surfactant | | 1.5 |

The mass ratio E/P between ethanol and 1-propanol was 3.15 (E/P=3.15).

Example 1-2

An inkjet ink was prepared in the same way as in Example 1-1 except that a novolak resin whose softening point VT (° C.) is 91.5° C. [PHENOLITE TD-2106 made by DIC Corporation] of 3.0 parts by mass and a novolak resin whose softening point VT (° C.) is 120° C. [PHENOLITE TD-2090 made by DIC Corporation mentioned above] of 3.0 parts by mass were concurrently used as a phenol resin.

Example 1-3

An inkjet ink was prepared in the same way as in Example 1-1 except that a novolak resin having a softening point VT (° C.) of 100° C. [PHENOLITE TD-2093Y made by DIC Corporation] of 3.0 parts by mass and a novolak resin having a softening point VT (° C.) of 120° C. [PHENOLITE TD-2090 made by DIC Corporation mentioned above] of 3.0 parts by mass were concurrently used as a phenol resin.

Example 1-4

An inkjet ink was prepared in the same way as in Example 1-1 except that a novolak resin whose softening point VT (° C.) is 80° C. [PHENOLITE TD-2131 made by DIC Corporation mentioned above] of 3.0 parts by mass and a novolak resin whose softening point VT (° C.) is 91.5° C. [PHENO- LITE TD-2106 made by DIC Corporation mentioned above] of 3.0 parts by mass were concurrently used as a phenol resin.

Example 1-5

An inkjet ink was prepared in the same way as in Example 1-1 except that only a novolak resin whose softening point VT (° C.) is 80° C. [PHENOLITE TD-2131 made of DIC Corporation mentioned above] of 6.0 parts by mass was compounded as a phenol resin.

Example 1-6

An inkjet ink was prepared in the same way as in Example 1-1 except that only a novolak resin whose softening point VT (° C.) is 91.5° C. [PHENOLITE TD-2106 made by DIC Corporation mentioned above] of 6.0 parts by mass was compounded as a phenol resin.

Example 1-7

An inkjet ink was prepared in the same way as in Example 1-1 except that only a novolak resin whose softening point VT (° C.) is 100° C. [PHENOLITE TD-2093Y made by DIC Corporation mentioned above] of 6.0 parts by mass was compounded as a phenol resin.

Example 1-8

An inkjet ink was prepared in the same way as in Example 1-1 except that only a novolak resin whose softening point VT (° C.) is 120° C. [PHENOLITE TD-2090 made by DIC Corporation mentioned above] of 6.0 parts by mass was compounded as a phenol resin.

Example 1-9

An inkjet ink was prepared in the same way as in Example 1-1 except that a terpene phenol resin whose hydroxyl value is 10 mgKOH/g of the same amount was compounded as a tackifier.

Example 1-10

An inkjet ink was prepared in the same way as in Example 1-1 except that a terpene phenol resin whose hydroxyl value is 40 mgKOH/g [SYLVARES TP95 made by Arizona Chemical Co. mentioned above] of the same amount was compounded as a tackifier.

Example 1-11

An inkjet ink was prepared in the same way as in Example 1-1 except that a terpene resin whose hydroxyl value is 3 mgKOH/g [YS resin PX800 made by YASUHARA CHEMICAL CO., LTD.] of the same amount was compounded as a tackifier.

Example 1-12

An inkjet ink was prepared in the same way as in Example 1-1 except that a terpene phenol resin whose hydroxyl value is 50 mgKOH/g [YS Polyester 1130 made by YASUHARA CHEMICAL CO., LTD.] of the same amount was compounded as a tackifier.

Example 1-13

An inkjet ink was prepared in the same way as in Example 1-1 except that a rosin ester resin whose hydroxyl value is 30 mgKOH/g [PENSEL D-125 made by ARAKAWA CHEMICAL INDUSTRIES, Ltd.] of the same amount was compounded as a tackifier.

Example 1-14

An inkjet ink was prepared in the same way as in Example 1-1 except that a rosin ester resin whose hydroxyl value is 11.5 mgKOH/g [KSU005 made by Harima Chemicals, Inc.] of the same amount was compounded as a tackifier.

Example 1-15

An inkjet ink was prepared in the same way as in Example 1-1 except that a rosin ester resin whose hydroxyl value is 40 mgKOH/g [Pentalyn CJ made by Rika Fine-Tech Inc.] of the same amount was compounded as a tackifier.

Comparative Example 1-1

An inkjet ink was prepared in the same way as in Example 1-1 except that only a novolak resin whose softening point VT (° C.) is 65° C. [Shonol (registered trademark) BRG-564G made by Showa Denko K.K.] of 6.0 parts by mass was compounded as a phenol resin.

Comparative Example 1-2

An inkjet ink was prepared in the same way as in Example 1-1 except that only a novolak resin whose softening point VT (° C.) is 130° C. [Shonol CKM-2432 made by Showa Denko K.K.] of 6.0 parts by mass was compounded as a phenol resin.

Comparative Example 1-3

An inkjet ink was prepared in the same way as in Example 1-1 except that only a styrene-maleic acid resin[softening point VT (° C.)=105° C.] of 6.0 parts by mass was compounded instead of a phenol resin. This corresponds to a reproduction of the inkjet ink of PTL 2.

Comparative Example 1-4

An inkjet ink was prepared in the same way as in Example 1-1 except that only a novolak resin whose softening point VT (° C.) is 80° C. [PHENOLITE TD-2131 made by DIC Corporation mentioned above] of 7.5 parts by mass was compounded as a phenol resin without compounding a tackifier.

Comparative Example 1-5

An inkjet ink was prepared in the same way as in Example 1-1 except that a terpene phenol resin functioning as a tackifier [YS Polyester U115 made by YASUHARA CHEMICAL CO., LTD., Hydroxyl value: 30 mgKOH/g mentioned above] of 7.5 parts by mass was compounded without compounding a phenol resin.

<Intermittent Printability Evaluation>

The inkjet ink prepared in each Example and in each Comparative Example was used in a thermal type inkjet printer [Print Mail Wide Array made by Videojet K.K., Set resolution 600×600 dpi], and whether it was possible to perform clear printing without causing the clogging of a nozzle or the like immediately after the end of a decapping time during which the inkjet ink in the nozzle is exposed to the open air while changing the length of the decapping time in a state in which ink droplets are not discharged was observed, and intermittent printability was evaluated according to the following criteria.

∘∘: It was possible to perform clear printing even if the decapping time is 20 minutes or more. Extremely excellent.

∘: It was possible to perform clear printing if the decapping time is 10 minutes or more and is less than 20 minutes. Excellent.

Δ: It was possible to perform clear printing if the decapping time is 1 minute or more and is less than 10 minutes. Ordinary level.

x: It was impossible to perform clear printing unless the decapping time is less than 1 minute. Defective.

<Abrasion Resistance Evaluation>

A bar code of 0.2 pt (line width 0.07 mm) was printed on the surface of an aluminum foil by use of the inkjet ink prepared in each Example and in each Comparative Example was used in the same inkjet printer as the printer used in the intermittent printability evaluation.

Thereafter, by use of a frictional testing machine of type I [No. 416 Clock Meter made by YASUDA SEIKI SEISAKUSHO, LTD.] specified in Japanese Industrial Standards JIS L 0849:2013 "Test methods for colour fastness to rubbing" a change caused when the bar code printed thereon was repeatedly rubbed by a white cotton cloth for friction at a constant speed was observed, and abrasion resistance was evaluated according to the following criteria.

∘∘: No change was observed in the bar code although it was rubbed ten times at a speed of 1200 mm/min of a friction block. Extremely excellent.

∘: When the bar code was rubbed ten times at a speed of 1200 mm/min of the friction block, extension caused by frictional heat was observed in a part of the bar code, but no change was observed in the bar code although it was rubbed ten times at a speed of 600 mm/min. Excellent.

Δ: When the bar code was rubbed ten times at a speed of 600 mm/min of the friction block, extension caused by frictional heat was observed in a part of the bar code, but a chip was not observed. Ordinary level.

x: When the bar code was rubbed ten times at a speed of 600 mm/min of the friction block, a chip was observed in a part of the bar code. Defective.

<Oil Resistance Evaluation>

A bar code of 0.2 pt (line width 0.07 mm) was printed on the surface of an aluminum foil by use of the inkjet ink prepared in each Example and in each Comparative Example in the same inkjet printer as the printer used in the intermittent printability evaluation.

Thereafter, vegetable oil, which was used as a substitute for sebum, was dropped onto the bar code, and after a fixed time of waiting, a change was observed when the bar code was wiped off with a piece of gauze, and oil resistance was evaluated according to the following criteria.

∘∘: No change was observed in the bar code although the bar code was wiped off after ten seconds of waiting from oil dropping. Extremely excellent.

∘: When the bar code was wiped off after ten seconds of waiting from oil dropping, extension caused by dissolution was observed in a part of the bar code, but no change was observed in the bar code although the bar code was wiped off after five seconds of waiting from oil dropping. Excellent.

Δ: When the bar code was wiped off after five seconds of waiting from oil dropping, extension caused by dissolution was observed in a part of the bar code, but a chip was not observed. Ordinary level.

x: When the bar code was wiped off after five seconds of waiting from oil dropping, a chip was observed in a part of the bar code. Defective.

xx: When the bar code was wiped off after five seconds of waiting from oil dropping, substantially all of the bar code came off. Extremely defective.

These results are shown in Table 2 to Table 5. In the tables, reference signs in sections of the kind of a tackifier designate as follows: Ro: rosin ester resin, Tp: terpene phenol resin, and T: terpene resin.

TABLE 2

|  |  |  |  | Example 1-1 | Example 1-2 | Example 1-3 | Example 1-4 | Example 1-5 |
|---|---|---|---|---|---|---|---|---|
| Component | Phenol resin | VT (° C.) | 65° C. | — | — | — | — | — |
|  |  |  | 80° C. | ∘ | — | — | ∘ | ∘ |
|  |  |  | 91.5° C. | — | ∘ | — | ∘ | — |
|  |  |  | 100° C. | — | — | ∘ | — | — |
|  |  |  | 120° C. | ∘ | ∘ | ∘ | — | — |
|  |  |  | 130° C. | — | — | — | — | — |
|  | Styrene-maleic acid resin |  |  | — | — | — | — | — |
|  | Tackifier | Kind |  | Tp | Tp | Tp | Tp | Tp |
|  |  | Hydroxyl value (mgKOH/g) |  | 30 | 30 | 30 | 30 | 30 |
| Evaluation | Intermittent printability |  |  | ∘∘ | ∘∘ | ∘ | ∘∘ | ∘∘ |
|  | Abrasion resistance |  |  | ∘∘ | ∘∘ | ∘∘ | Δ | Δ |
|  | Oil resistance |  |  | ∘∘ | ∘∘ | ∘∘ | ∘ | ∘ |

TABLE 3

| | | | | Example 1-6 | Example 1-7 | Example 1-8 | Example 1-9 | Example 1-10 |
|---|---|---|---|---|---|---|---|---|
| Component | Phenol resin | VT (° C.) | 65° C. | — | — | — | — | — |
| | | | 80° C. | — | — | — | ○ | ○ |
| | | | 91.5° C. | ○ | — | — | — | — |
| | | | 100° C. | — | ○ | — | — | — |
| | | | 120° C. | — | — | ○ | ○ | ○ |
| | | | 130° C. | — | — | — | — | — |
| | Styrene-maleic acid resin | | | — | — | — | — | — |
| | Tackifier | Kind | | Tp | Tp | Tp | Tp | Tp |
| | | Hydroxyl value (mgKOH/g) | | 30 | 30 | 30 | 10 | 40 |
| Evaluation | Intermittent printability | | | ○○ | ○○ | Δ | ○○ | ○○ |
| | Abrasion resistance | | | ○ | ○ | ○ | ○○ | ○○ |
| | Oil resistance | | | ○○ | ○○ | ○○ | ○○ | ○○ |

TABLE 4

| | | | | Example 1-11 | Example 1-12 | Example 1-13 | Example 1-14 | Example 1-15 |
|---|---|---|---|---|---|---|---|---|
| Component | Phenol resin | VT (° C.) | 65° C. | — | — | — | — | — |
| | | | 80° C. | ○ | ○ | ○ | ○ | ○ |
| | | | 91.5° C. | — | — | — | — | — |
| | | | 100° C. | — | — | — | — | — |
| | | | 120° C. | ○ | ○ | ○ | ○ | ○ |
| | | | 130° C. | — | — | — | — | — |
| | Styrene-maleic acid resin | | | — | — | — | — | — |
| | Tackifier | Kind | | T | Tp | Ro | Ro | Ro |
| | | Hydroxyl value (mgKOH/g) | | 3 | 50 | 30 | 11.5 | 40 |
| Evaluation | Intermittent printability | | | Δ | Δ | ○ | ○ | ○ |
| | Abrasion resistance | | | ○○ | ○○ | ○○ | ○○ | ○○ |
| | Oil resistance | | | ○○ | ○○ | ○○ | ○○ | ○○ |

TABLE 5

| | | | | Comparative Example 1-1 | Comparative Example 1-2 | Comparative Example 1-3 | Comparative Example 1-4 | Comparative Example 1-5 |
|---|---|---|---|---|---|---|---|---|
| Component | Phenol resin | VT (° C.) | 65° C. | ○ | — | — | — | — |
| | | | 80° C. | — | — | — | ○ | — |
| | | | 91.5° C. | — | — | — | — | — |
| | | | 100° C. | — | — | — | — | — |
| | | | 120° C. | — | — | — | — | — |
| | | | 130° C. | — | ○ | — | — | — |
| | Styrene-maleic acid resin | | | — | — | ○ | — | — |
| | Tackifier | Kind | | Tp | Tp | Tp | — | Tp |
| | | Hydroxyl value (mgKOH/g) | | 30 | 30 | 30 | — | 30 |
| Evaluation | Intermittent printability | | | ○○ | x | x | x | Δ |
| | Abrasion resistance | | | x | ○○ | x | ○ | x |
| | Oil resistance | | | Δ | ○○ | x | ○ | xx |

From results of Examples 1-1 to 1-15 and Comparative Examples 1-3 to 1-5 of Table 2 to Table 5, it has been found that, in the dye-based compounding, the use of a phenol resin as a binder resin and the concurrent use of a tackifier make it possible to create an inkjet ink excellent in intermittent printability when it is used in an on-demand type inkjet printer, and therefore it is possible to provide an inkjet ink that is characterized in that printings are not easily blurred when printing is performed and that is characterized in that printings are not easily blurred or do not easily come off even if the printings are repeatedly rubbed with a fingertip or the like after printing.

However, from results of Examples 1-1 to 1-15 and Comparative Examples 1-1 and 1-2, it has been found that, in order to obtain the aforementioned effects, the softening point VT (° C.) of a phenol resin is required to be 70° C. or more and 125° C. or less, and, within this range, is preferably 80° C. or more, particularly 90° C. or more, and is preferably 120° C. or less, particularly 110° C. or less.

From results of Examples 1-1 to 1-4, it has been found that, in order to even further improve the aforementioned effects, it is preferable to, as a phenol resin, concurrently use two kinds of phenol resins having mutually different softening points VT (° C.) each of which falls within the aforementioned range, and particularly it is preferable to concurrently use two kinds of phenol resins, i.e., a phenol resin whose softening point VT (° C.) is less than 100° C. and a phenol resin whose softening point VT (° C.) is 100° C. or more.

From results of Examples 1-5 to 1-8, it has been found that, if only one kind of phenol resin is used, a phenol resin whose softening point VT (° C.) falls within a more desirable range than the aforementioned range is selected and used, and, as a result, it is possible to obtain an inkjet ink having high general-purpose properties that is capable of performing moderately-excellent printing that is close to a case in which the aforementioned two kinds of phenol resins are concurrently used and that is capable of coping with various inkjet printers that are different from each other in the setting of printing conditions with a single composition using the only one kind of phenol resin.

Additionally, from results of Examples 1-1 and 1-9 to 1-15, it has been found that it is preferable to use a substance whose hydroxyl value is 10 mgKOH/g or more and 45 mgKOH/g or less as a tackifier, and, in consideration of securing excellent intermittent printability as much as possible, it is preferable to use a terpene phenol resin as a tackifier.

Example 2-1

The following components were mixed together at the ratio shown in Table 6, and were then filtered by use of a membrane filter of 5 μm so as to prepare an inkjet ink.
(Phenol Resin)
Novolak resin, PHENOLITE TD-2106 made by DIC Corporation mentioned above, softening point VT (° C.)=91.5° C.
(Tackifier)
Rosin ester resin, ESTER GUM AA-G made by ARAKAWA CHEMICAL INDUSTRIES, Ltd., acid value: 4.4 mgKOH/g
(Organic Solvent)
Ethanol
1-propanol
1-butanol
(Pigment Dispersion Liquid)
Titanium oxide:Dispersing agent:Ethanol (mass ratio)=50:5:45
(Surfactant)
Silicone-based surfactant
(Lubricant)
Oleic amide

TABLE 6

| Component | Parts by mass |
| --- | --- |
| Phenol resin VT(° C.) = 91.5° C. | 5.0 |
| Tackifier (4.4 mgKOH/g) | 5.0 |
| Ethanol | 35.1 |
| 1-propanol | 30.0 |
| 1-butanol | 1.8 |
| Pigment dispersion liquid | 20.0 |
| Silicone-based surfactant | 2.5 |
| Lubricant | 0.6 |

The total amount of ethanol was 44.1 parts by mass with the one included in the pigment dispersion liquid, and the mass ratio E/P between ethanol and 1-propanol was 1.47 (E/P=1.47).

Example 2-2

An inkjet ink was prepared in the same way as in Example 2-1 except that a substance whose acid value is 3.6 mgKOH/g of ESTER GUM AA-G made by ARAKAWA CHEMICAL INDUSTRIES, Ltd., of the same amount was compounded as a tackifier.

Example 2-3

An inkjet ink was prepared in the same way as in Example 2-1 except that a rosin ester resin whose acid value is 6.5 mgKOH/g [ESTER GUM AAV made by ARAKAWA CHEMICAL INDUSTRIES, Ltd.] of the same amount was compounded as a tackifier.

Example 2-4

An inkjet ink was prepared in the same way as in Example 2-1 except that a rosin ester resin whose acid value is 8.5 mgKOH/g [ESTER GUM H made by ARAKAWA CHEMICAL INDUSTRIES, Ltd.] of the same amount was compounded as a tackifier.

Example 2-5

An inkjet ink was prepared in the same way as in Example 2-1 except that a rosin ester resin whose acid value is 15 mgKOH/g [PENSEL D-125 made by ARAKAWA CHEMICAL INDUSTRIES, Ltd.] of the same amount was compounded as a tackifier.

Example 2-6

An inkjet ink was prepared in the same way as in Example 2-1 except that a terpene phenol resin [YS Polyster U115 made by YASUHARA CHEMICAL CO., LTD., Hydroxyl value: 30 mgKOH/g mentioned above] of the same amount was compounded as a tackifier.

Example 2-7

An inkjet ink was prepared in the same way as in Example 2-1 except that a novolak resin whose softening point VT (° C.) is 80° C. [PHENOLITE TD-2131 made by DIC Corporation mentioned above] of the same amount was compounded as a phenol resin.

Example 2-8

An inkjet ink was prepared in the same way as in Example 2-1 except that a novolak resin whose softening point VT (° C.) is 100° C. [PHENOLITE TD-2093Y made by DIC Corporation mentioned above] of the same amount was compounded as a phenol resin.

Example 2-9

An inkjet ink was prepared in the same way as in Example 2-1 except that a novolak resin whose softening point VT (° C.) is 120° C. [PHENOLITE TD-2090 made by DIC Corporation mentioned above] of the same amount was compounded as a phenol resin.

Example 2-10

An inkjet ink was prepared in the same way as in Example 2-1 except that, on the condition that the amount of ethanol is 28.1 parts by mass and the amount of 1-propanol is 37.0 parts by mass, the total amount of ethanol was set to be 37.1 parts by mass with the one included in the pigment dispersion liquid, and the mass ratio E/P between ethanol and 1-propanol was set to be 1.00.

Example 2-11

An inkjet ink was prepared in the same way as in Example 2-1 except that, on the condition that the amount of ethanol is 46.6 parts by mass and the amount of 1-propanol is 18.5 parts by mass, the total amount of ethanol was set to be 55.6 parts by mass with the one included in the pigment dispersion liquid, and the mass ratio E/P between ethanol and 1-propanol was set to be 3.00.

Example 2-12

An inkjet ink was prepared in the same way as in Example 2-1 except that, on the condition that the amount of ethanol is 21.5 parts by mass and the amount of 1-propanol is 43.6 parts by mass, the total amount of ethanol was set to be 30.5 parts by mass with the one included in the pigment dispersion liquid, and the mass ratio E/P between ethanol and 1-propanol was set to be 0.70.

Example 2-13

An inkjet ink was prepared in the same way as in Example 2-1 except that, on the condition that the amount of ethanol is 48.6 parts by mass and the amount of 1-propanol is 16.5 parts by mass, the total amount of ethanol was set to be 57.6 parts by mass with the one included in the pigment dispersion liquid, and the mass ratio E/P between ethanol and 1-propanol was set to be 3.50.

Example 2-14

An inkjet ink was prepared in the same way as in Example 2-1 except that, on the condition that the amount of ethanol is 35.7 parts by mass and the amount of 1-propanol is 30.4 parts by mass, the total amount of ethanol was set to be 44.7 parts by mass with the one included in the pigment dispersion liquid, and the mass ratio E/P between ethanol and 1-propanol was set to be 1.47, and 1-butanol was not compounded.

Comparative Example 2-1

An inkjet ink was prepared in the same way as in Example 2-1 except that a polyamide resin [Versamid 759 (registered trademark) made by BASF Japan Ltd.] of the same amount was compounded instead of a phenol resin.

Comparative Example 2-2

An inkjet ink was prepared in the same way as in Example 2-1 except that a tackifier was not compounded, and the amount of a phenol resin was set to be 10 parts by mass.

Comparative Example 2-3

An inkjet ink was prepared in the same way as in Example 2-1 except that a novolak resin whose softening point VT (° C.) is 65° C. [Shonol (registered trademark) BRG-564G made by Showa Denko K.K. mentioned above] of the same amount was compounded as a phenol resin.

Comparative Example 2-4

An inkjet ink was prepared in the same way as in Example 2-1 except that a novolak resin whose softening point VT (° C.) is 130° C. [Shonol CKM-2432 made by Showa Denko K.K. mentioned above] of the same amount was compounded as a phenol resin.

The intermittent printability evaluation concerning the inkjet ink prepared by each Example and by each Comparative Example mentioned above and each test mentioned below were performed, and its characteristics were evaluated.

<Abrasion Resistance Evaluation>

A bar code of 0.2 pt (line width 0.07 mm) was printed on the surface of a polypropylene film by use of the inkjet ink prepared in each Example and in each Comparative Example was used in the same inkjet printer as the printer used in the intermittent printability evaluation.

Thereafter, by use of a frictional testing machine of type I [No. 416 Clock Meter made by YASUDA SEIKI SEISAKUSHO, LTD.] specified in Japanese Industrial Standards JIS L 0849:2013 "Test methods for colour fastness to rubbing" a change caused when the bar code printed thereon was repeatedly rubbed by a white cotton cloth for friction at a constant speed was observed, and abrasion resistance was evaluated according to the following criteria.

○: No change was observed in the bar code although it was rubbed ten times at a speed of 600 mm/min of a friction block. Excellent.

Δ: When the bar code was rubbed ten times at a speed of 600 mm/min of the friction block, extension caused by frictional heat was observed in a part of the bar code, but a chip was not observed. Ordinary level.

x: When the bar code was rubbed ten times at a speed of 600 mm/min of the friction block, a chip was observed in a part of the bar code. Defective.

<Oil Resistance Evaluation>

A bar code of 0.2 pt (line width 0.07 mm) was printed on the surface of a polypropylene film by use of the inkjet ink prepared in each Example and in each Comparative Example in the same inkjet printer as the printer used in the intermittent printability evaluation.

Thereafter, vegetable oil, which was used as a substitute for sebum, was dropped onto the bar code, and after a fixed time of waiting, a change was observed when the bar code was wiped off with a piece of gauze, and oil resistance was evaluated according to the following criteria.

○: No change was observed in the bar code although the bar code was wiped off after five seconds of waiting from oil dropping. Excellent.

Δ: When the bar code was wiped off after five seconds of waiting from oil dropping, extension caused by dissolution was observed in a part of the bar code, but a chip was not observed. Ordinary level.

x: When the bar code was wiped off after five seconds of waiting from oil dropping, a chip was observed in a part of the bar code. Defective.

<Cellophane Tape Peel Test>

Solid printing was performed on the surface of a polypropylene film by use of the inkjet ink prepared in each Example and in each Comparative Example in the same inkjet printer as the printer used in the intermittent printability evaluation.

Thereafter, it was statically placed for 24 hours at room temperature, and then a cellophane tape [Cellotape (registered trademark) made by Nichiban Co., Ltd.] was attached to the resulting solid print and was rubbed ten times with a thumb, and a state was observed when it was peeled off by 90°, and fixability was evaluated according to the following criteria.

○: The solid print was not peeled off at all. Excellent.
Δ: Ordinary level, although the solid print was peeled off extremely slightly.
x: The solid print was peeled off. Defective.

These results are shown in Table 7 to Table 10. In the tables, reference signs in sections of the kind of a tackifier designate as follows: Ro: rosin ester resin, Tp: terpene phenol resin, and T: terpene resin.

TABLE 7

|  |  |  |  | Example 2-1 | Example 2-2 | Example 2-3 | Example 2-4 | Example 2-5 |
|---|---|---|---|---|---|---|---|---|
| Component | Phenol resin | VT (° C.) | 65° C. | — | — | — | — | — |
|  |  |  | 80° C. | — | — | — | — | — |
|  |  |  | 91.5° C. | ○ | ○ | ○ | ○ | ○ |
|  |  |  | 100° C. | — | — | — | — | — |
|  |  |  | 120° C. | — | — | — | — | — |
|  |  |  | 130° C. | — | — | — | — | — |
|  | Polyamide resin |  |  | — | — | — | — | — |
|  | Tackifier | Kind |  | Ro | Ro | Ro | Ro | Ro |
|  |  | Acid value (mgKOH/g) |  | 4.4 | 3.6 | 6.5 | 8.5 | 15 |
|  | Alcohol | E/P |  | 1.47 | 1.47 | 1.47 | 1.47 | 1.47 |
|  |  | 1-butanol |  | Present | Present | Present | Present | Present |
| Evaluation | Intermittent printability |  |  | ○○ | ○○ | ○○ | ○ | Δ |
|  | Abrasion resistance |  |  | ○ | ○ | ○ | ○ | ○ |
|  | Oil resistance |  |  | ○ | ○ | ○ | ○ | ○ |
|  | Cellophane tape peel test |  |  | ○ | ○ | ○ | ○ | ○ |

TABLE 8

|  |  |  |  | Example 2-6 | Example 2-7 | Example 2-8 | Example 2-9 | Example 2-10 |
|---|---|---|---|---|---|---|---|---|
| Component | Phenol resin | VT (° C.) | 65° C. | — | — | — | — | — |
|  |  |  | 80° C. | — | ○ | — | — | — |
|  |  |  | 91.5° C. | ○ | — | — | — | ○ |
|  |  |  | 100° C. | — | — | ○ | — | — |
|  |  |  | 120° C. | — | — | — | ○ | — |
|  |  |  | 130° C. | — | — | — | — | — |
|  | Polyamide resin |  |  | — | — | — | — | — |
|  | Tackifier | Kind |  | Tp | Ro | Ro | Ro | Ro |
|  |  | Acid value (mgKOH/g) |  | — | 4.4 | 4.4 | 4.4 | 4.4 |
|  | Alcohol | E/P |  | 1.47 | 1.47 | 1.47 | 1.47 | 1.00 |
|  |  | 1-butanol |  | Present | Present | Present | Present | Present |
| Evaluation | Intermittent printability |  |  | ○○ | ○○ | ○○ | Δ | ○○ |
|  | Abrasion resistance |  |  | ○ | Δ | ○ | ○ | ○ |
|  | Oil resistance |  |  | ○ | ○ | ○ | ○ | ○ |
|  | Cellophane tape peel test |  |  | Δ | ○ | ○ | ○ | ○ |

TABLE 9

|  |  |  |  | Example 2-11 | Example 2-12 | Example 2-13 | Example 2-14 |
|---|---|---|---|---|---|---|---|
| Component | Phenol resin | VT (° C.) | 65° C. | — | — | — | — |
|  |  |  | 80° C. | — | — | — | — |
|  |  |  | 91.5° C. | ○ | ○ | ○ | ○ |
|  |  |  | 100° C. | — | — | — | — |
|  |  |  | 120° C. | — | — | — | — |
|  |  |  | 130° C. | — | — | — | — |
|  | Polyamide resin |  |  | — | — | — | — |

TABLE 9-continued

|  |  |  | Example 2-11 | Example 2-12 | Example 2-13 | Example 2-14 |
|---|---|---|---|---|---|---|
|  | Tackifier | Kind | Ro | Ro | Ro | Ro |
|  |  | Acid value (mgKOH/g) | 4.4 | 4.4 | 4.4 | 4.4 |
|  | Alcohol | E/P | 3.00 | 0.70 | 3.50 | 1.47 |
|  |  | 1-butanol | Present | Present | Present | Not Present |
| Evaluation | Intermittent printability |  | ∘∘ | Δ | Δ | ∘∘ |
|  | Abrasion resistance |  | ∘ | ∘ | ∘ | Δ |
|  | Oil resistance |  | ∘ | ∘ | ∘ | ∘ |
|  | Cellophane tape peel test |  | ∘ | ∘ | ∘ | ∘ |

TABLE 10

|  |  |  |  | Comparative Example 2-1 | Comparative Example 2-2 | Comparative Example 2-3 | Comparative Example 2-4 |
|---|---|---|---|---|---|---|---|
| Component | Phenol resin | VT (° C.) | 65° C. | — | — | ∘ | — |
|  |  |  | 80° C. | — | — | — | — |
|  |  |  | 91.5° C. | — | ∘ | — | — |
|  |  |  | 100° C. | — | — | — | — |
|  |  |  | 120° C. | — | — | — | — |
|  |  |  | 130° C. | — | — | — | ∘ |
|  | Polyamide resin |  |  | ∘ | — | — | — |
|  | Tackifier | Kind |  | Ro | — | Ro | Ro |
|  |  | Acid value (mgKOH/g) |  | 4.4 | — | 4.4 | 4.4 |
|  | Alcohol | E/P |  | 1.47 | 1.47 | 1.47 | 1.47 |
|  |  | 1-butanol |  | Present | Present | Present | Present |
| Evaluation | Intermittent printability |  |  | ∘∘ | x | ∘∘ | x |
|  | Abrasion resistance |  |  | x | x | x | ∘ |
|  | Oil resistance |  |  | x | x | ∘ | ∘ |
|  | Cellophane tape peel test |  |  | Δ | x | ∘ | ∘ |

From results of Examples 2-1 to 2-14 and Comparative Examples 2-1 and 2-2 in Table 7 to Table 10, it has been found that, likewise, in the pigment-based compounding, the use of a phenol resin as a binder resin and the concurrent use of a tackifier make it possible to create an inkjet ink excellent in intermittent printability when it is used in an on-demand type inkjet printer, and therefore it is possible to provide an inkjet ink that is characterized in that printings are not easily blurred when printing is performed and that is characterized in that printings are not easily blurred or do not easily come off even if the printings are repeatedly rubbed with a fingertip or the like after printing.

However, from results of Examples 2-1 to 2-14 and Comparative Examples 2-3 and 2-4, it has been found that, in order to obtain the aforementioned effects, the softening point VT (° C.) of a phenol resin is required to be 70° C. or more and 125° C. or less, and, within this range, is preferably 80° C. or more, particularly 90° C. or more, and is preferably 120° C. or less, particularly 110° C. or less.

Additionally, from results of Examples 2-1 to 2-6, it has been found that, in order to secure fixability even higher than is required when printing is performed with respect specifically to a polyolefin-based low-polarity surface or the like, it is preferable to use a rosin ester resin as a tackifier, and it is preferable to use a rosin ester resin whose acid value is 2 mgKOH/g or more and 10 mgKOH/g or less as the aforementioned rosin ester resin.

Still additionally, from results of Examples 2-1 and 2-10 to 2-14, it has been found that, in order to even further improve intermittent printability, the mass ratio E/P between ethanol and propanol is preferably 1.0 or more and is preferably 3.0 or less, particularly 2.0 or less, and it is preferable to concurrently use 1-butanol.

The invention claimed is:

1. An inkjet ink comprising a binder resin, a tackifier, a colorant, and an organic solvent, wherein the binder resin is a phenol resin having a softening point in a range of 70° C. or more and 125° C. or less, the colorant is a dye and the tackifier is at least one kind selected from the group consisting of a terpene phenol resin and a rosin ester resin whose hydroxyl value is 10 mgKOH/g or more and is 45 mgKOH/g or less.

2. The inkjet ink according to claim 1, wherein the organic solvent comprises at least an alcohol having one to three carbon atoms.

3. The inkjet ink according to claim 2, wherein the compounding ratio of an alcohol having one to three carbon atoms is 70 mass % or more and 95 mass % or less.

4. The inkjet ink according to claim 2, wherein the organic solvent comprises at least ethanol and propanol at a rate of 1.0 or more and 6.0 or less in terms of a mass ratio E (ethanol)/P (propanol).

5. The inkjet ink according to claim 3, wherein the organic solvent comprises at least ethanol and propanol at a rate of 1.0 or more and 6.0 or less in terms of a mass ratio E (ethanol)/P (propanol).

6. The inkjet ink according to claim 1, wherein the tackifier is a terpene phenol resin whose hydroxyl value is 10 mgKOH/g or more and is 45 mgKOH/g or less.

* * * * *

UNITED STATES PATENT AND TRADEMARK OFFICE
CERTIFICATE OF CORRECTION

PATENT NO. : 10,344,173 B2
APPLICATION NO. : 15/553167
DATED : July 9, 2019
INVENTOR(S) : Hidehiro Takemoto and Kozo Isobe It is certified that error appears in the above-identified patent and that said Letters Patent is hereby corrected as shown below:

On the Title Page

Item (73) (Assignee):
Please change the listing of Assignee "GENERAL CO., LTD, Osaka (JP)" to read -- GENERAL CO., LTD., Osaka (JP) --

Signed and Sealed this
Eighth Day of October, 2019

Andrei Iancu
*Director of the United States Patent and Trademark Office*